US011353592B2

(12) United States Patent
Bosse et al.

(10) Patent No.: US 11,353,592 B2
(45) Date of Patent: Jun. 7, 2022

(54) COMPLEX GROUND PROFILE ESTIMATION

(71) Applicant: Zoox, Inc., Foster City, CA (US)

(72) Inventors: Michael Carsten Bosse, Cupertino, CA (US); Jacob Daniel Boydston, Foster City, CA (US); Joshua Kriser Cohen, Sunnyvale, CA (US); Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 259 days.

(21) Appl. No.: 16/588,717

(22) Filed: Sep. 30, 2019

(65) Prior Publication Data
US 2021/0096264 A1    Apr. 1, 2021

(51) Int. Cl.
| | | |
|---|---|---|
| *G01S 17/931* | (2020.01) | |
| *G01S 7/48* | (2006.01) | |
| *G05D 1/00* | (2006.01) | |
| *G05D 1/02* | (2020.01) | |
| *H04L 67/12* | (2022.01) | |

(52) U.S. Cl.
CPC .......... *G01S 17/931* (2020.01); *G01S 7/4802* (2013.01); *G01S 7/4808* (2013.01); *G05D 1/0088* (2013.01); *G05D 1/0231* (2013.01); *G05D 2201/0213* (2013.01); *H04L 67/12* (2013.01)

(58) Field of Classification Search
CPC .... G01S 17/931; G01S 7/4802; G01S 7/4808; G05D 1/0088; G05D 1/0231; G05D 2201/0213; H04L 67/12; B60W 40/076; B60W 2420/52; B60W 30/10; B60W 40/06

See application file for complete search history.

(56) References Cited

U.S. PATENT DOCUMENTS

| | | |
|---|---|---|
| 9,285,230 B1 | 3/2016 | Silver et al. |
| 2010/0114416 A1 | 5/2010 | Au et al. |

(Continued)

FOREIGN PATENT DOCUMENTS

| | | |
|---|---|---|
| EP | 2761591 A1 | 8/2014 |
| WO | WO2013045932 A1 | 4/2013 |
| WO | WO2018208591 A1 | 11/2018 |

OTHER PUBLICATIONS

Office Action for U.S. Appl. No. 16/588,529, dated May 21, 2021, Wang, "Collision Avoidance Perception System", 18 pages.

(Continued)

*Primary Examiner* — Marthe Y Marc-Coleman
(74) *Attorney, Agent, or Firm* — Lee & Hayes, P.C.

(57) ABSTRACT

Classifying sensor data as being associated with ground (as opposed to an object) may comprise determining a number of channels of sensor data that have returns in them, setting a number of control points and a number of knots of a curve based at least in part on the number of channels that have returns, and fitting a curve having the number of control points and the number of knots to the sensor data. The curve may be used to distinguish sensor data associated with the ground from sensor data associated with an object. Determining the curve may additionally or alternatively include limiting an elevation value of a control point and/or knot based on elevation value(s) of the sensor data, weighting the sensor data based at least in part on elevation values associated with the sensor data, and/or adjusting knot spacing, et alia.

20 Claims, 8 Drawing Sheets

(56) References Cited

U.S. PATENT DOCUMENTS

| | | |
|---|---|---|
| 2013/0079990 A1 | 3/2013 | Fritsch et al. |
| 2018/0021954 A1 | 1/2018 | Fischer et al. |
| 2018/0060725 A1 | 3/2018 | Groh et al. |
| 2018/0086336 A1 | 3/2018 | Jones et al. |
| 2018/0329411 A1 | 11/2018 | Levinson et al. |
| 2019/0080613 A1 | 3/2019 | Homann |
| 2019/0308625 A1 | 10/2019 | Iimura et al. |
| 2020/0158874 A1 | 5/2020 | Li et al. |
| 2020/0174112 A1* | 6/2020 | Xing ................. G01S 13/867 |
| 2021/0096566 A1 | 4/2021 | Wang et al. |
| 2021/0201145 A1* | 7/2021 | Pham ................. G06K 9/6272 |

OTHER PUBLICATIONS

Devy M et al: "Integrated subsystem for Obstacle detection from a belt of micro-cameras" 11, Advanced Robotics, 2009. ICAR 2009. International Conference on, IEEE, Piscataway, NJ, USA, Jun. 22, 2009 (Jun. 22, 2009), pp. 1-6.

The PCT Search Report and Written Opinion dated Jan. 19, 2021 for PCT Application No. PCT/US2020/051135, 15 pages.

The PCT Search Report and Written Opinion dated Jan. 20, 2021 for PCT Application No. PCT/US20/51132, 30 pages.

Sivaraman Sayanan et al., "11 Looking at Vehicles on the Road: A Survey of Vision-Based Vehicle Detection, Tracking, and Behavior Analysis 11", IEEE Transactions on Intelligent Transportation Systems, IEEE, Piscataway, NJ, USA, vol. 14, No. 4, Dec. 1, 2013 (Dec. 1, 2013), pp. 1773-1795.

Office Action for U.S. Appl. No. 16/588,529, dated Sep. 20, 2021, Wang, "Collision Avoidance Perception System", 21 pages.

Office Action for U.S. Appl. No. 16/588,529, dated Feb. 4, 2022, Wang, "Collision Avoidance Perception System", 25 Pages.

International Preliminary Reporton Patentability, dated Apr. 14, 2022, from the International Bureau in PCT Patent Application No. PCT/US2020/051135.

\* cited by examiner

US 11,353,592 B2

COMPLEX GROUND PROFILE ESTIMATION

BACKGROUND

Safety of passengers in a vehicle and other people or objects in proximity to the vehicle is of the upmost importance. Such safety is often predicated on an accurate detection of a potential collision and timely deployment of a safety measure. To safely operate, an autonomous vehicle may include multiple sensors and various systems for detecting and tracking events surrounding the autonomous vehicle and may take these events into account when controlling the autonomous vehicle. For example, the autonomous vehicle may detect and track every object within a 360-degree view of a set of cameras, LIDAR sensors, radar, and/or the like to control the autonomous vehicle safely. Detecting salient objects in a flat environment may be more simple since the ground can be modeled as a plane, but distinguishing objects from the ground may be more difficult in environments with changes in grade.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
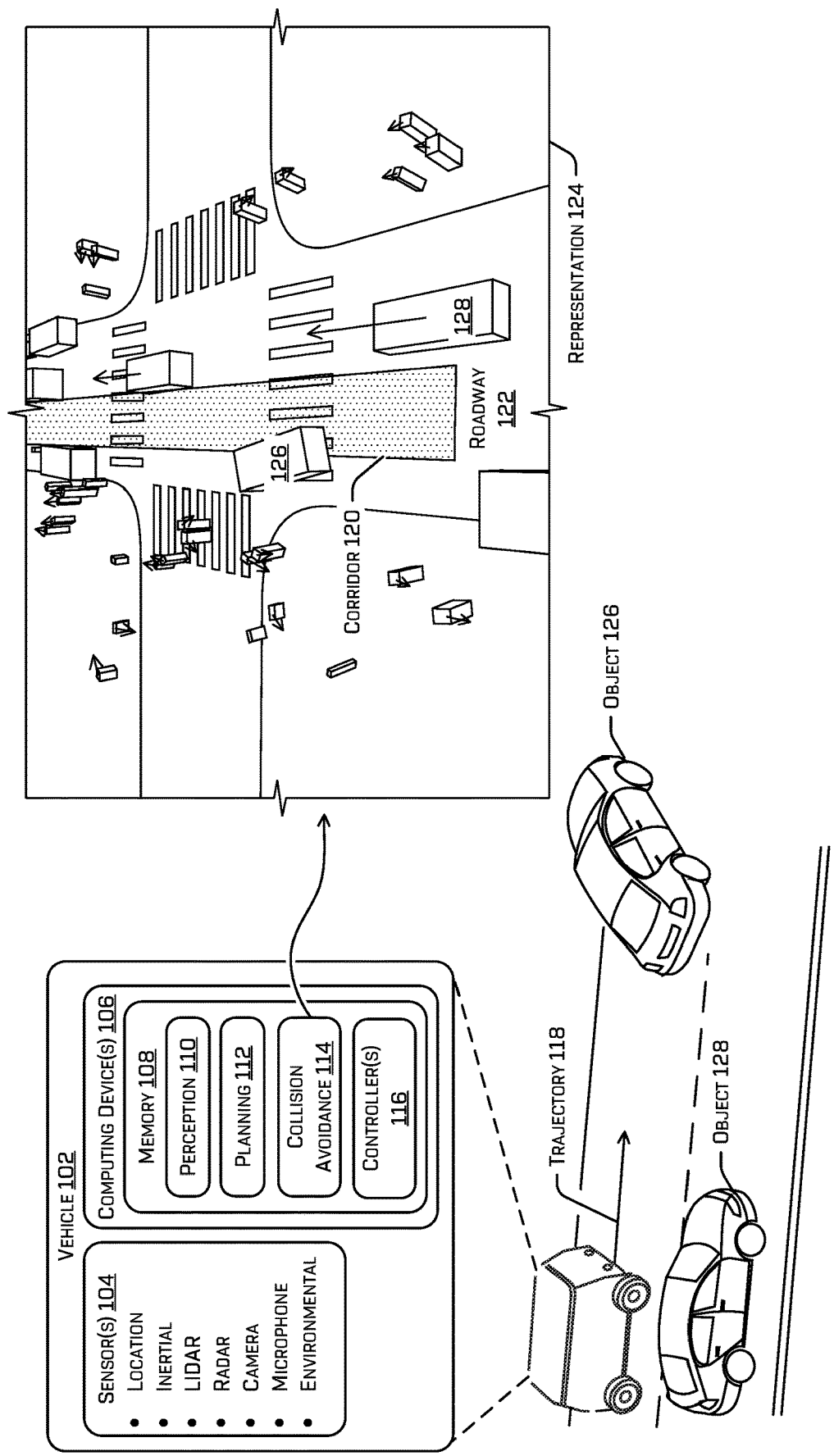
FIG. 1 illustrates an example scenario in which an autonomous vehicle configured with a collision avoidance component may generate a trajectory for controlling the autonomous vehicle and determine, by the collision avoidance component, whether to implement the trajectory or institute an alternate maneuver, such as a safe stop.

Techniques for collision avoidance may comprise a collision avoidance system that validates, rejects, or replaces a trajectory generated to control a vehicle. The collision avoidance system discussed herein may comprise a secondary perception component and/or validation component. For example, the collision avoidance system may receive a trajectory from a planning component and receive, from one or more sensors, sensor data associated with an environment surrounding the autonomous vehicle. In some examples, while a primary perception component may determine perception data based at least in part on all or near all of the sensor data, the secondary perception component of the collision avoidance system may determine a corridor associated with the trajectory and conduct the operations discussed herein based at least in part on a subset of the sensor data associated with the corridor. The collision avoidance system may determine the corridor based at least in part on a width and/or length of the vehicle, a current velocity of the vehicle and/or a velocity associated with the trajectory, and/or an offset distance. In at least some examples, such a secondary perception system may further use similar and/or dissimilar hardware and or software with respect to the primary system.

In some examples, the secondary perception component may classify the subset of sensor data (associated with the corridor) as belonging to either a ground classification or an object classification. The ground classification may identify sensor data as being associated with a roadway and/or other environmental surface, whereas the object classification may comprise any other object that is not ground. In some examples, the techniques discussed herein may simply classify sensor data as either ground or an object, without further identifying what type of object.

In some examples, the techniques may comprise ground estimation techniques that may improve (e.g., decrease) a false negative and/or false positive rate associated with classifying sensor data as ground or as an object. In some examples, the techniques may comprise estimating a line and/or plane to model a profile of a roadway surface (e.g., a roadway height profile), particularly for complex roadways that may comprise one or more changes in grade (e.g., slope of the roadway surface). These ground fitting techniques may comprise determining a spline (e.g., one or more polynomials, a Bezier curve) associated with the ground based at least in part on determining a number of control points and knots of the spline based at least in part on a number or percentage of sensor data that comprises a valid return. In some examples, when the sensor data is sparse for a portion of the environment, the determined spline may be inaccurate. The techniques may additionally or alternatively comprise weighting the sensor data before generating the spline (e.g., by weighting a least squares regression towards a lowest and/or highest (in elevation) sensor data point), altering a height value (e.g., ordinate) associated with one or more control points based at least in part on sensor data as a post-fitting operation, and/or altering a spacing of the knots as a post-fitting operation. In some examples, determining the spline may comprise determining values of the control points and/or knots based at least in part on a regression algorithm (e.g., least squares).

The secondary perception component may comprise an M-estimator, but may lack an object classifier such as, for example, a neural network, decision tree, and/or the like for classifying objects. In additional or alternate examples, the secondary perception system may comprise an ML model of any type, configured to disambiguate classifications of objects. By contrast, the primary perception component may comprise a pipeline of hardware and/or software components, which may comprise one or more machine-learning models, Bayesian filters (e.g., Kalman filters), graphics processing unit(s) (GPU(s)), and/or the like. In some examples, the perception data may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The techniques may additionally or alternatively comprise determining a threshold distance based at least in part on a velocity associated with the trajectory. For example, the threshold distance may be a stopping distance estimate associated with the vehicle at the current speed of the vehicle and/or at the velocity specified by the trajectory, given the environmental conditions (e.g., gradient, static coefficient associated with roadway and/or roadway condition). The validation component of the collision avoidance system may determine whether any sensor data classified as an object is at a distance from the vehicle that is less than the threshold distance or whether a furthest point classified as ground is less than the threshold distance. In either case, the validation component may cause the vehicle to execute an alternate maneuver and/or to re-determine a trajectory based at least in part on determining that an object or the furthest detected ground is within the threshold distance of the vehicle. If the validation component determines that the nearest object is at a distance beyond the threshold distance and the furthest sensor data classified as ground is at a distance beyond the threshold distance, the validation component may validate the trajectory, which may comprise transmitting the trajectory to system controller(s) that may generate signals for actuating drive components of the vehicle to track the trajectory.

Additionally or alternatively, the validation component may determine whether to validate the trajectory or initiate an alternate maneuver based at least in part on a current velocity of the vehicle, a velocity associated with the trajectory, a velocity associated with an object, a current pose of the vehicle, and/or determining whether the sensor data associated with the object and/or ground classification is valid. For example, the techniques may comprise determining whether a current velocity, steering angle, steering rate, and/or heading of the vehicle comports (is within a respective threshold) with a velocity, steering angle, steering rate, and/or heading indicated by the trajectory.

For example, upon validating a trajectory according to the techniques discussed herein, the collision avoidance system may pass or otherwise allow the trajectory to be implemented by the vehicle. However, upon determining that the trajectory is invalid, according to the techniques discussed herein, the collision avoidance system may cause the vehicle to initiate a contingent trajectory (e.g., a safe stop maneuver, an alternate maneuver) and/or re-determine a new trajectory. In some examples, a planning component of the vehicle may determine the trajectory based at least in part on sensor data, map data, localization data (e.g., where the autonomous vehicle is/how the autonomous vehicle is oriented relative to objects in the environment, mapped locations, and/or the like), and/or perception data (e.g., what is in the environment, characteristics of objects in the environment) received from a primary perception component.

The techniques discussed herein may improve the safety of a vehicle by preventing invalid or risky trajectories from being implemented by the vehicle. Moreover, the techniques may reduce the amount of computational bandwidth, memory, and/or power consumed for collision avoidance in comparison to former techniques. The accuracy of the collision avoidance system may also be higher than an accuracy of the primary perception system, thereby reducing an overall error rate of trajectories implemented by the autonomous vehicle by filtering out invalid trajectories.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, a collision avoidance component 114, and/or system controller(s) 116. Although depicted in FIG. 1 for illustrative purposes, it should be understood that the collision avoidance component 114 may reside in/on a separate computing device (or otherwise) than any one or more of the other components. In some examples, the perception component 110 may be a primary perception component among other perception components, such as a secondary perception component that may be part of collision avoidance component 114. In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, localization information (e.g., where the vehicle 102 is in the environment relative to a map and/or features detected by the perception component 110), and/or the like. The trajectory 118 may comprise instructions for controller(s) 116 to actuate drive components of the vehicle 102 to effectuate a steering angle and/or steering rate, which may result in a vehicle position, vehicle velocity, and/or vehicle acceleration. For example, the trajectory 118 may comprise a target heading, target steering angle, target steering rate, target position, target velocity, and/or target acceleration for the controller(s) 116 to track. The perception component 110 and/or the planning component 112 may include one or more machine-learned (ML) models and/or other computer-executable instructions.

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The object classifications determined by the perception component 110 may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 110 may be collectively referred to as perception data. Once the perception component 110 has generated perception data, the perception component 110 may provide the perception data to the planning component 112.

The planning component 112 may use the perception data received from perception component 110, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, grade changes, objects in front of other objects), and/or environmental effects such as fog, snow, and/or the like. For example, the sensor data may comprise LIDAR and/or radar data, which the perception component 110 may receive as input. The perception component 110 may be configured to detect as many objects and information about the environment as possible to avoid failing to account for an event or object behavior that should be taken into account by the planning component 112 in determining the trajectory 118.

By contrast, the collision avoidance component 114 may monitor a corridor 120 associated with the trajectory 118. For example, the collision avoidance component 114 may receive the trajectory 118 from the planning component 112 and determine the corridor 120 based at least in part on the trajectory. Determining the corridor may comprise determining a region of the environment based at least in part on a current velocity of the vehicle 102, a velocity specified by the trajectory 118, and/or an offset that may be based at least in part on steering rack actuator gains, vehicle kinematics such as tire slippage, body roll, etc., and/or the like. In at least some examples, such a corridor may additionally, or alternatively, represent a simplistic geometric region relative to the vehicle. The collision avoidance component 114 may determine a subset of the sensor data associated with the corridor 120 and conduct the operations discussed herein based at least in part on the subset. For example, in the example scenario, the collision avoidance component 114 may determine a subset that comprises sensor data that includes the portion of the environment indicated by corridor 120, which may comprise a part of the roadway 122 depicted in the sensor data representation 124 and/or part of object 126. Although the perception data determined by perception component 110 may comprise perception data associated with object 128 and trajectory 118 may be generated based at least in part on that perception data, collision avoidance component 114 may simply monitor sensor data associated with the corridor 120 to ensure the trajectory 118 will not or is not likely to result in a collision.

The collision avoidance component 114 may comprise a secondary perception component that may classify the subset of sensor data into one of two classifications: ground or object. In some examples, there may be more classifications (e.g., different object classifications). The collision avoidance component 114 may additionally or alternatively comprise a validation component that may determine the threshold distance discussed herein and/or determine whether to validate or reject the trajectory 118. Validating the trajectory 118 may comprise transmitting the trajectory 118 to the controller(s) 116 (e.g., the validation component may comprise a multiplexer, one or more transistors configured as a switch that passes the trajectory 118 upon receiving a signal from the validation component, and/or the like that may provide a signal that allows the trajectory 118 signal to pass to the controller(s) 116). Rejecting the trajectory 118 may comprise transmitting a message to the planning component 112 to initiate re-determining a trajectory and/or initiating an alternate maneuver, such as a safe stop maneuver (e.g., emergency braking, pull over and park) and/or a contingent trajectory that may be received from the planning component 112 in addition to the trajectory 118 and/or stored in the memory 108. In some examples, the collision avoidance 114 may determine that at least a portion of the subset of the sensor data is valid or invalid based at least in part on an orientation of the sensors and/or a topology of the environment and/or a lower and upper bound of a valid portion of the sensor data, as discussed in more detail herein.

In some examples, the controller(s) 116 may comprise software and/or hardware for actuating drive components of the vehicle 102 sufficient to track the trajectory 118. For example, the controller(s) 116 may comprise one or more proportional-integral-derivative (PID) controllers.

Figure 2:
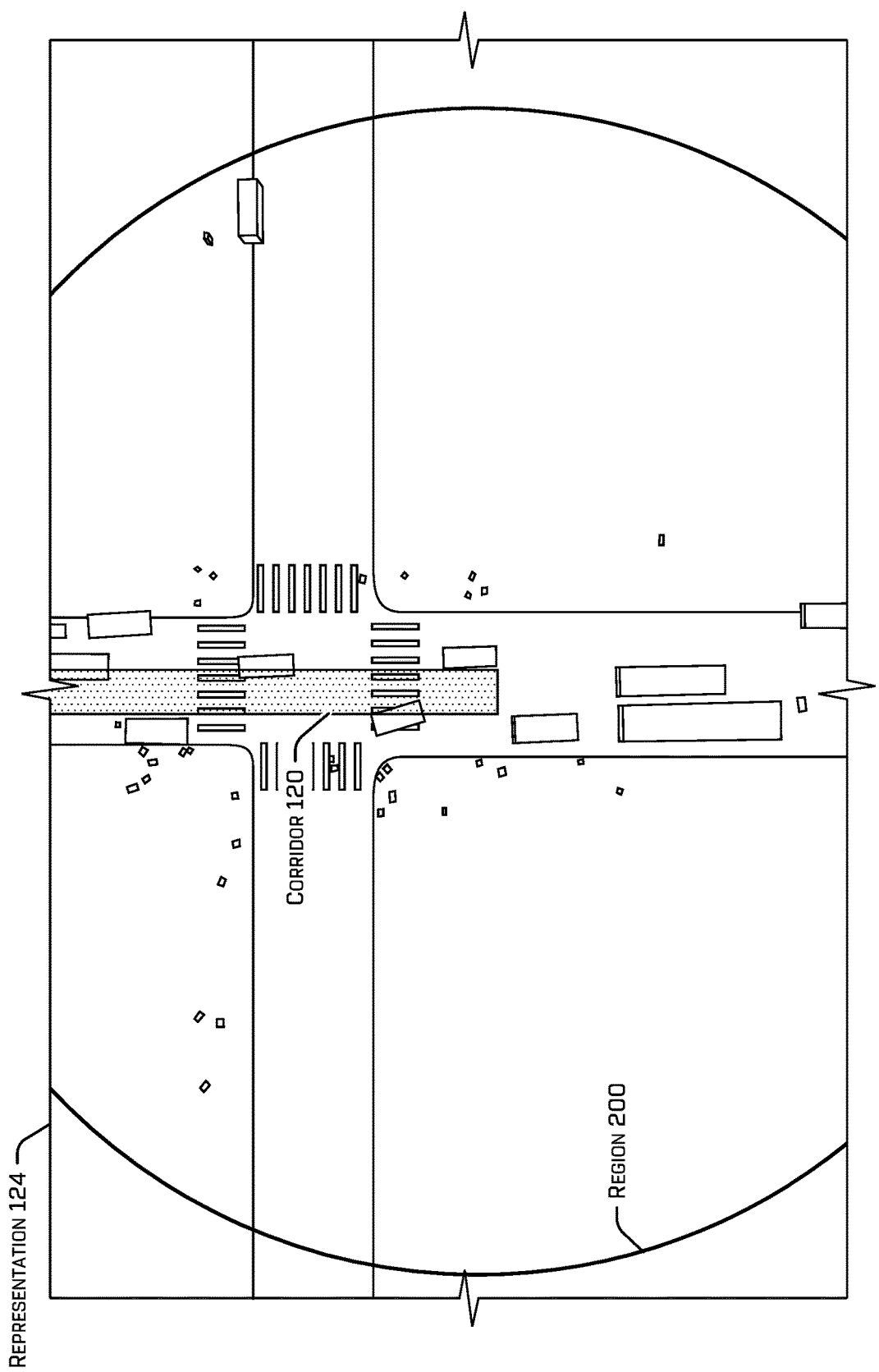
FIG. 2 illustrates a top-down view of an example scenario and a corridor monitored by the collision avoidance component compared to an additional or alternative collision avoidance system monitoring region.

FIG. 2 illustrates a top-down view of the sensor data representation 124 of example scenario 100 and the corridor 120 monitored by the collision avoidance component compared to an additional or alternative collision avoidance system monitoring region 200. Sensor data within region 200, represented as a circle, may be monitored by an additional or alternative collision avoidance system. In an additional or alternate example, region 200 may identify a distance from the vehicle 102 monitored by the perception component 110. In such an example, the region 200 may correspond to a maximal effective range of one or more of the sensor(s) 104.

Note that, in the depicted example, the trajectory 118 is straight; therefore, the corridor 120 is correspondingly straight. It is noted that the corridor 120 shape may be based at least in part on a shape of the trajectory 118 and may be curved, not uniform, and/or not straight, in accordance with the trajectory 118 and/or a topology of the environment. In some examples, the corridor 120 may be two or three or more-dimensional.

Example System

Figure 3:
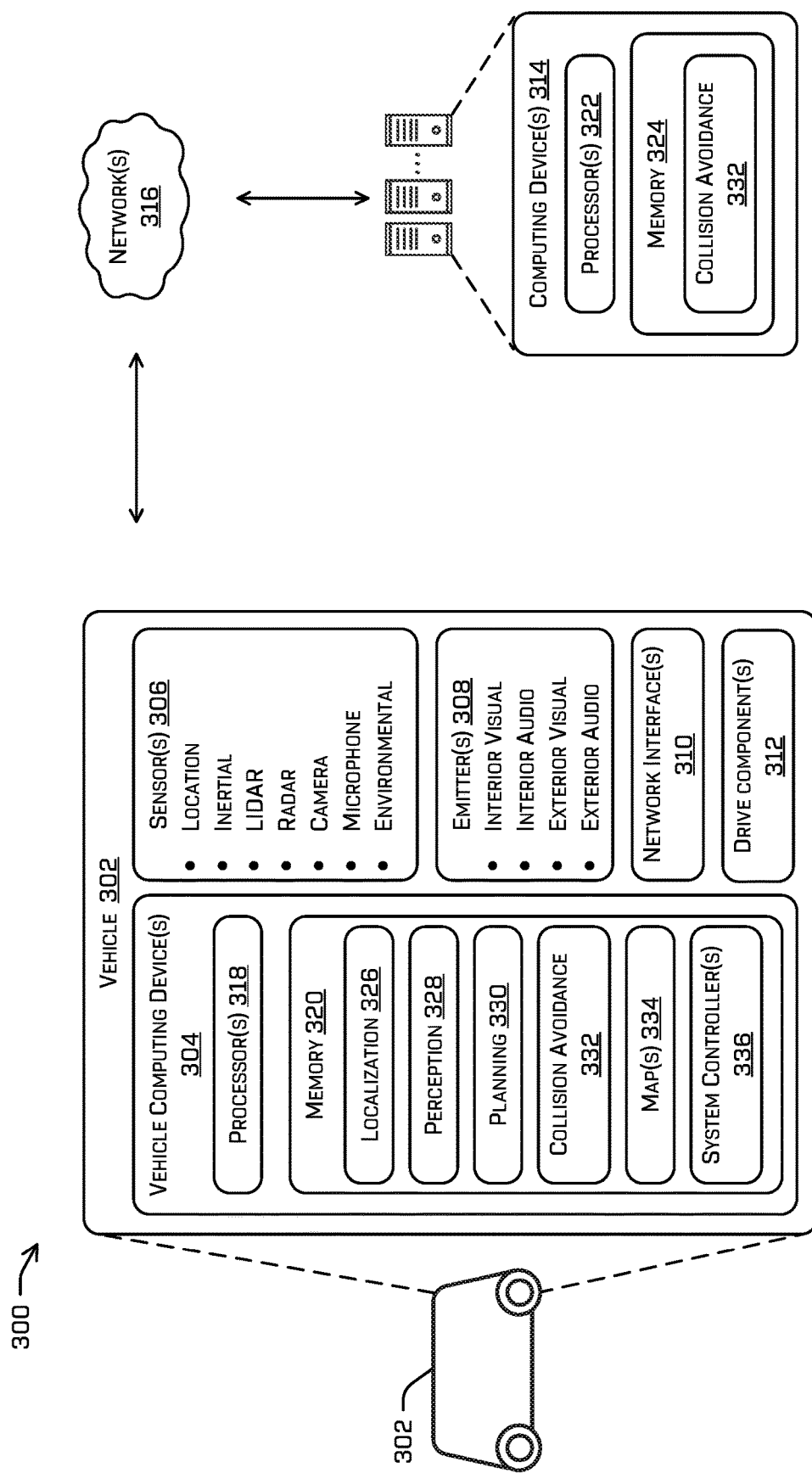
FIG. 3 illustrates a block diagram of an example system comprising a collision avoidance component.

FIG. 3 illustrates a block diagram of an example system 300 that implements the techniques discussed herein. In some instances, the example system 300 may include a vehicle 302, which may represent the vehicle 102 in FIG. 1. In some instances, the vehicle 302 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 302 may be a fully or partially autonomous vehicle having any other level or classification. Moreover, in some instances, the techniques described herein may be usable by non-autonomous vehicles as well.

The vehicle 302 may include a vehicle computing device(s) 304, sensor(s) 306, emitter(s) 308, network interface(s) 310, and/or drive component(s) 312. Vehicle computing device(s) 304 may represent computing device(s) 106 and sensor(s) 306 may represent sensor(s) 104. The system 300 may additionally or alternatively comprise computing device(s) 314.

In some instances, the sensor(s) 306 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 306 may include multiple instances of each of these or other types of sensors. For instance, the radar sensors may include individual radar sensors located at the corners, front, back, sides, and/or top of the vehicle 302. As another example, the cameras may include multiple cameras disposed at various locations about the exterior and/or interior of the vehicle 302. The sensor(s) 306 may provide input to the vehicle computing device(s) 304 and/or to computing device(s) 314.

The vehicle 302 may also include emitter(s) 308 for emitting light and/or sound, as described above. The emitter(s) 308 in this example may include interior audio and visual emitter(s) to communicate with passengers of the vehicle 302. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 308 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 302 may also include network interface(s) 310 that enable communication between the vehicle 302 and one or more other local or remote computing device(s). For instance, the network interface(s) 310 may facilitate communication with other local computing device(s) on the vehicle 302 and/or the drive component(s) 312. Also, the network interface (s) 310 may additionally or alternatively allow the vehicle to communicate with other nearby computing device(s) (e.g., other nearby vehicles, traffic signals, etc.). The network interface(s) 310 may additionally or alternatively enable the vehicle 302 to communicate with computing device(s) 314. In some examples, computing device(s) 314 may comprise one or more nodes of a distributed computing system (e.g., a cloud computing architecture).

The network interface(s) 310 may include physical and/or logical interfaces for connecting the vehicle computing device(s) 304 to another computing device or a network, such as network(s) 316. For example, the network interface(s) 310 may enable Wi-Fi-based communication such as via frequencies defined by the IEEE 300.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 304 and/or the sensor(s) 306 may send sensor data, via the network(s) 316, to the computing device(s) 314 at a particular frequency, after a lapse of a predetermined period of time, in near real-time, etc.

In some instances, the vehicle 302 may include one or more drive components 312. In some instances, the vehicle 302 may have a single drive component 312. In some instances, the drive component(s) 312 may include one or more sensors to detect conditions of the drive component(s) 312 and/or the surroundings of the vehicle 302. By way of example and not limitation, the sensor(s) of the drive component(s) 312 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 312. In some cases, the sensor(s) on the drive component(s) 312 may overlap or supplement corresponding systems of the vehicle 302 (e.g., sensor(s) 306).

The drive component(s) 312 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 312 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 312. Furthermore, the drive component(s) 312 may also include one or more communication connection(s) that enable communication by the respective drive component with one or more other local or remote computing device(s).

The vehicle computing device(s) 304 may include processor(s) 318 and memory 320 communicatively coupled with the one or more processors 318. Memory 320 may represent memory 108. Computing device(s) 314 may also include processor(s) 322, and/or memory 324. The processor(s) 318 and/or 322 may be any suitable processor capable of executing instructions to process data and perform operations as described herein. By way of example and not limitation, the processor(s) 318 and/or 322 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 320 and/or 324 may be examples of non-transitory computer-readable media. The memory 320 and/or 324 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 320 and/or memory 324 may store a localization component 326, perception component 328, planning component 330, collision avoidance component 332, map(s) 334, and/or system controller(s) 336. Perception component 328 may represent perception component 110, planning component 330 may represent planning component 112, and/or collision avoidance component 332 may represent collision avoidance component 114.

In at least one example, the localization component 326 may include hardware and/or software to receive data from the sensor(s) 306 to determine a position, velocity, and/or orientation of the vehicle 302 (e.g., one or more of an x-, y-, z-position, roll, pitch, or yaw). For example, the localization component 326 may include and/or request/receive map(s) 334 of an environment and can continuously determine a location, velocity, and/or orientation of the autonomous vehicle within the map(s) 334. In some instances, the localization component 326 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 326 may provide data to various components of the vehicle 302 to determine an initial position of an autonomous vehicle for generating a trajectory and/or for generating map data, as discussed herein. In some examples, localization component 326 may provide, to the collision avoidance component 332, a location and/or orientation of the vehicle 302 relative to the environment and/or sensor data associated therewith.

In some instances, perception component 328 may comprise a primary perception system and/or a prediction system implemented in hardware and/or software. The perception component 328 may detect object(s) in in an environment surrounding the vehicle 302 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 328 is referred to as perception data.

The planning component 330 may receive a location and/or orientation of the vehicle 302 from the localization component 326 and/or perception data from the perception component 328 and may determine instructions for controlling operation of the vehicle 302 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 336 and/or drive component(s) 312 may parse/cause to be carried out, second instructions for the emitter(s) 308 may be formatted according to a second format associated therewith).

The collision avoidance component 332 may operate on the vehicle 302 and/or on the computing device(s) 314. In some examples, the collision avoidance component 332 may be downstream (receive an output) from the planning component 330 in a pipeline. The collision avoidance component 332 may be configured to pass all, part, or none of the output of the planning component 330, depending on the determinations discussed herein, to system controller(s) 336 for implementation. In some examples, the collision avoidance component 332 may comprise a feedback loop for providing input to the planning component 330, such as a flag or message that triggers re-determination of a trajectory.

The memory 320 and/or 324 may additionally or alternatively store a mapping system (e.g., generating a map based at least in part on sensor data), a planning system, a ride management system, etc. Although localization component 326, perception component 328, planning component 330, map(s) 334, and/or system controller(s) 336 are illustrated as being stored in memory 320, any of these components may include processor-executable instructions, machine-learned model(s) (e.g., a neural network), and/or hardware and all or part of any of these components may be stored on memory 324 or configured as part of computing device(s) 314.

As described herein, the localization component 326, the perception component 328, the planning component 330, and/or other components of the system 300 may comprise one or more ML models. For example, the localization component 326, the perception component 328, and/or the planning component 330 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 320 may additionally or alternatively store one or more system controller(s) 336, which may be configured to control steering, propulsion, braking, safety, emitters, communication, and other systems of the vehicle 302. These system controller(s) 336 may communicate with and/or control corresponding systems of the drive component(s) 312 and/or other components of the vehicle 302. For example, the planning component 330 may generate instructions based at least in part on perception data generated by the perception component 328, which the collision avoidance component 332 may validate and/or transmit to the system controller(s) 336. The system controller(s) 336 may control operation of the vehicle 302 based at least in part on the instructions received from the planning component 330 and/or collision avoidance component 332. In some examples, the collision avoidance component 332 may replace instructions generated by the planning component 330 with alternate instructions associated with a contingent trajectory such as, for example, a contingent trajectory that may specify an alternate maneuver, and/or the like.

It should be noted that while FIG. 3 is illustrated as a distributed system, in alternative examples, components of the vehicle 302 may be associated with the computing device(s) 314 and/or components of the computing device(s) 314 may be associated with the vehicle 302. That is, the vehicle 302 may perform one or more of the functions associated with the computing device(s) 314, and vice versa.

Example Process

Figure 4:
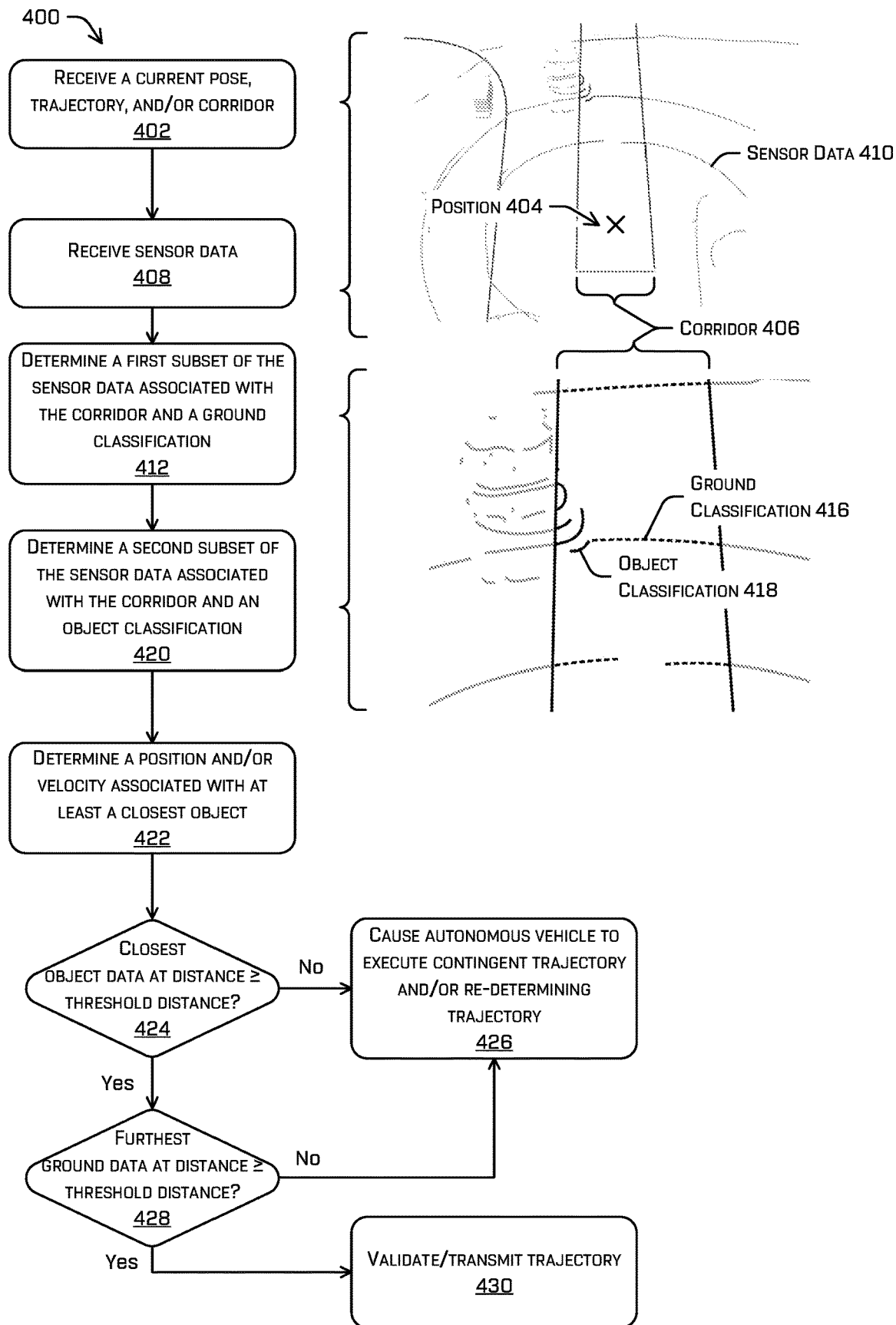
FIG. 4 illustrates a pictorial flow diagram of an example process for validating a trajectory and/or implementing an alternate maneuver using the collision avoidance component.

FIG. 4 illustrates a pictorial flow diagram of an example process 400 for validating a trajectory output by a planning component of an autonomous vehicle. In some examples, example process 400 may be executed by at least a collision avoidance component during operation of an autonomous vehicle.

At operation 402, example process 400 may comprise receiving a current pose, trajectory, and/or corridor associated with an autonomous vehicle, according to any of the techniques discussed herein. For example, the current pose may be received from a localization component, the trajectory may be received from a planning component and/or one or more sensors of the autonomous vehicle (e.g., wheel encoders, GPS), and/or the corridor may be received from the planning component and/or determined by the collision avoidance component. In some examples, determining the corridor may be based at least in part on the trajectory, a width and/or length of the autonomous vehicle, a current velocity, and/or an offset. FIG. 4 illustrates a position 404 of the autonomous vehicle and a corridor 406. In at least some examples, such corridor dimensions may be based on, for example, parameters associated with the vehicle. As a non-limiting example, the length of the corridor may be a function of the velocity of the vehicle, whereas the width, as another example, may be based on a turning radius of the vehicle, likely speeds associated with objects in the vicinity of the vehicle, and the like. The trajectory is unillustrated to increase clarity of the diagram. In some examples, the trajectory may comprise a current and/or planned position and/or velocity of the autonomous vehicle.

At operation 408, example process 400 may comprise receiving sensor data from a sensor associated with the autonomous vehicle, according to any of the techniques discussed herein. For example, the sensor data 410 may comprise LIDAR and/or radar data, among other types of sensor data. In some examples, the sensor data may comprise depth data (e.g., data indicating a distance from the sensor/autonomous vehicle to a surface in the environment), Doppler data associated with detected surfaces, and/or any other type of sensors data that indicates the position of objects in the environment surrounding the autonomous vehicle.

Figure 5:
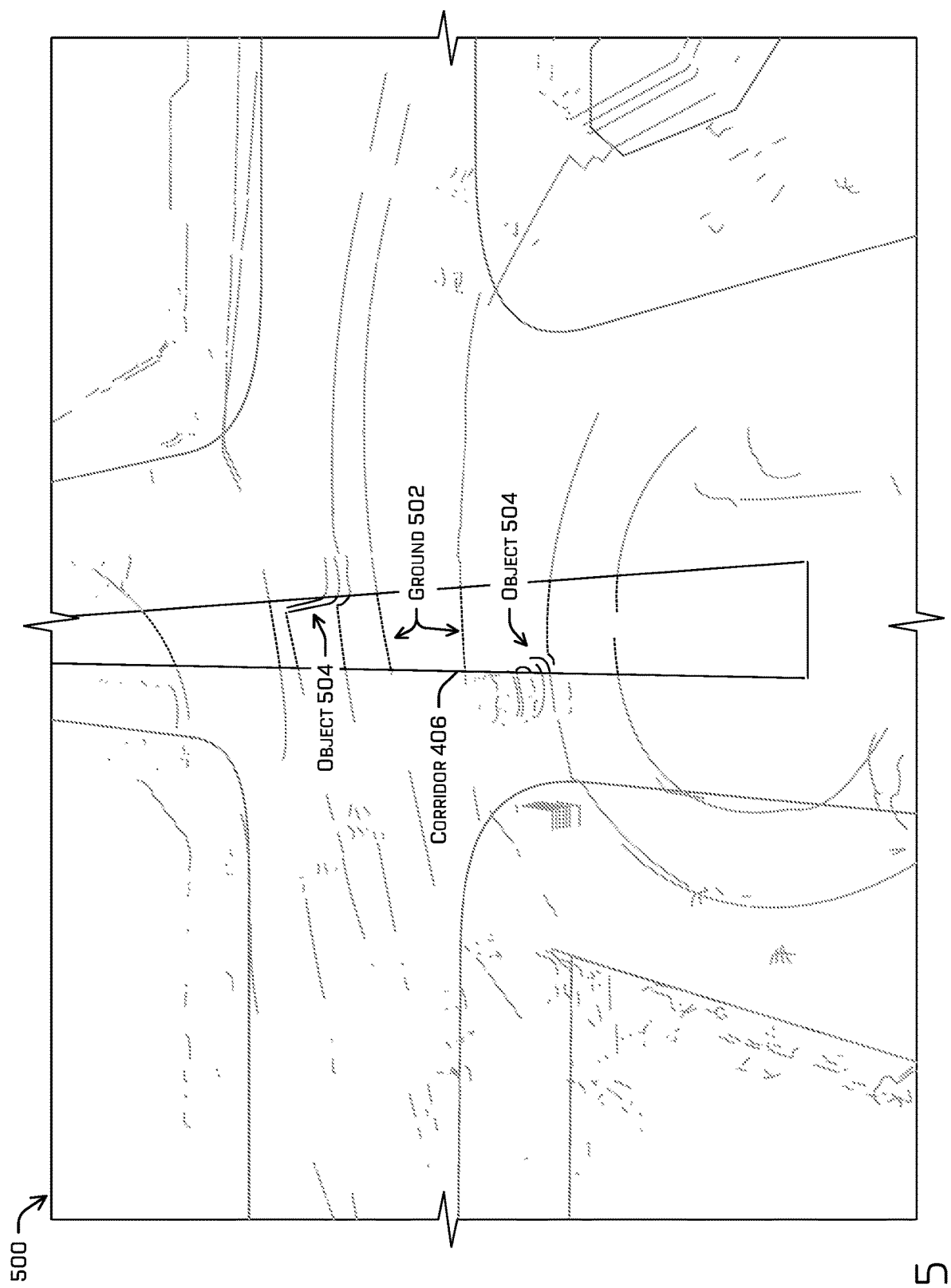
FIG. 5 illustrates example sensor data associated with the example scenario of FIG. 3, a corridor, and classification of sensor data as a ground classification or an object classification.

At operation 412, example process 400 may comprise determining a first subset of the sensor data associated with the corridor and a ground classification, according to any of the techniques discussed herein. In some examples, the example process 400 may comprise determining a subset of the sensor data that is associated with the corridor and classifying the subset into one of two classifications, a ground classification (at operation 412) and an object classification (at operation 420). FIG. 4 depicts a portion of FIG. 5. FIG. 5 depicts sensor data 500 associated with the example scenario 100 and sensor data representation 124. FIG. 5 depicts corridor 406, sensor data outside the corridor 406 as gray, and the subset of sensor data within the corridor 406 as black. FIG. 5 also depicts the first subset of sensor data within the corridor 406 that is classified as ground 502 as dotted lines and the second subset of sensor data within the corridor 406 that is classified as an object 504 as solid lines.

Determining that the first subset of the sensor data is associated with the ground classification may comprise determining a continuity between the sensor data and determining that the sensor data is continuous. Determining that the sensor data is continuous may comprise determining that a spacing between the sensor data is within a range of spacing (e.g., less than or equal to a threshold distance between points, wherein in at least some examples, such threshold distance may be fixed and/or a function of the range of the points), determining that an angle between the sensor data is within a range of angles (e.g., an azimuth between two points is within a range of azimuths, a (vertical) gradient between two points is within a range of gradients), determining that a surface roughness of a plurality of sensor data points is less than or equal to a surface roughness threshold, determining that the plurality of sensor data points is associated with a variance that is equal to or less than a variance threshold (e.g., a variance associated with a spacing (e.g., distance) between sensor data points, a variance associated with an angular displacement between sensor data points), and/or the like. For example, ground classification 416 is associated with sensor data that smoothly follows a contour of the topology/LIDAR data. In contrast, object classification 418 may be associated with data points that do not exhibit the same continuity/spacing as the sensor data associated with the ground classification 416.

Figure 7:
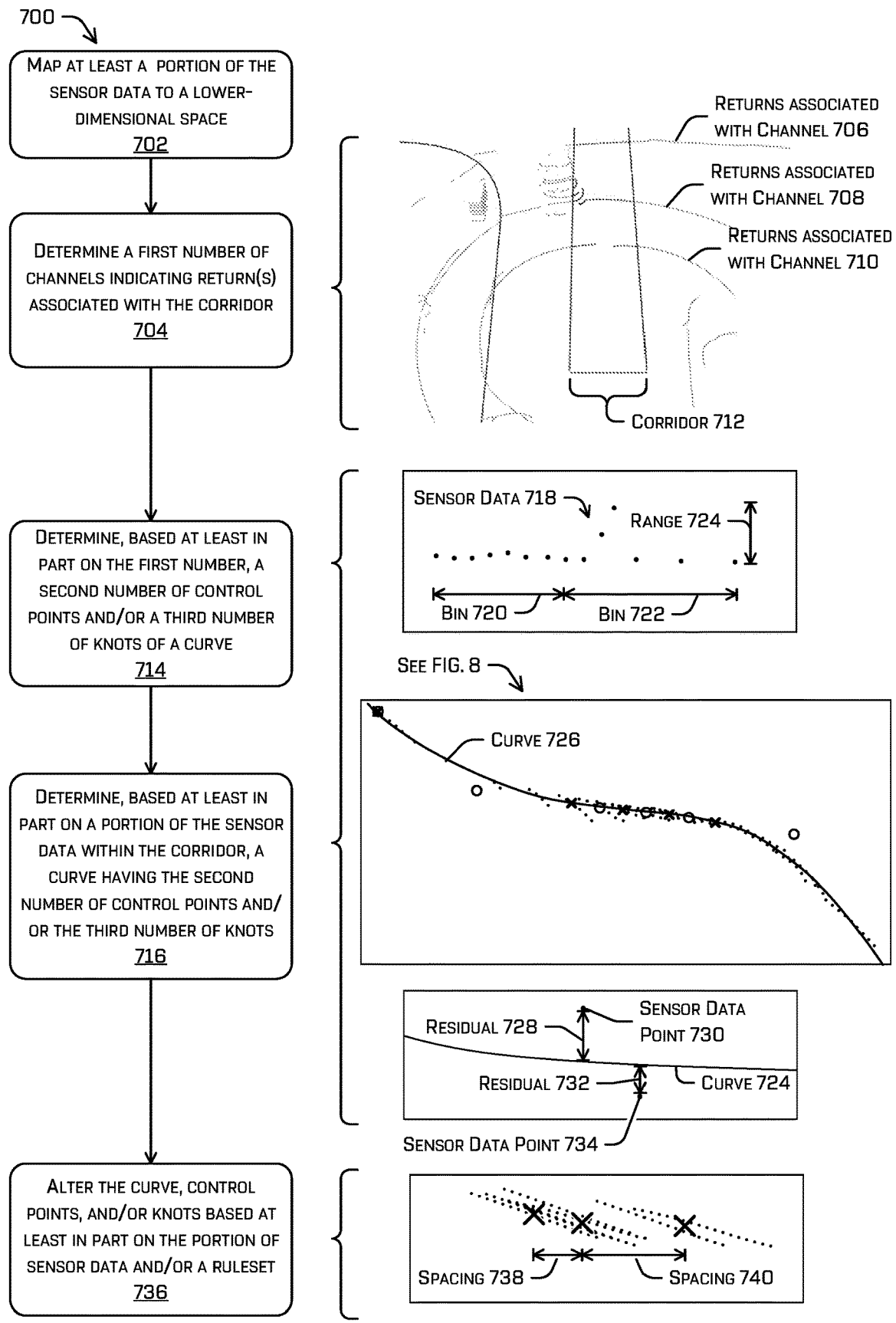
FIG. 7 illustrates a pictorial flow diagram of an example process for classifying sensor data as ground or as an object based at least in part on determining a curve to fit the sensor data.

As discussed in more detail regarding FIG. 7, determining the first subset associated with the ground classification may additionally or alternatively comprise fitting a line (e.g., a curve such as a polynomial, spline, and/or the like) and/or plane to at least a portion of the subset of sensor data associated with the corridor and identifying, as part of the first subset, points of the sensor data that are within a threshold distance of the line and/or plane. In some examples, the threshold distance may be defined to be a distance perpendicular (tangential) to the line and/or plane.

At operation 420, example process 400 may comprise determining a second subset of the sensor data associated with the corridor and an object classification, according to any of the techniques discussed herein. For example, operation 420 may comprise identifying sensor data points that are located above (e.g., having an elevation value that exceeds) the line or plane determined at operation 412. In some examples, the line may be determined in association with a profile of the sensor data (e.g., associated with an elevation and/or longitudinal position of the sensor data) and operation 420 may comprise translating the line across the corridor. In some instances, sensor data not classified as ground at operation 412 may be classified as an object (e.g., any sensor data not classified as ground may be classified as an object). In some examples, operation 420 may comprise determining that a portion of the second subset is associated with an object based at least in part on a clustering, region growing, and/or similar technique.

In some examples, operation 412 and/or operation 420 may additionally or alternatively comprise classifying sensor data associated with an expanded corridor as ground or an object, wherein the expanded corridor includes the corridor plus a margin. For example, the corridor may be expanded laterally according to a multiplier (e.g., 110%, 115%, any other value) and/or according to an additional distance (e.g., expanded laterally by 0.5 meters, 15 centimeters, any other value).

At operation 422, example process 400 may comprise determining a position and/or velocity associated with at least a closest object, according to any of the techniques discussed herein. For example, operation 422 may comprise determining a velocity of an object based at least in part on accumulating sensor data associated with the object over time. In an additional or alternate example, determining the velocity of the object may be based at least in part on a doppler value indicated by a radar device, sonar device, and/or the like. In some examples, operation 422 may comprise determining a position and/or velocity associated with additional objects identified at operation 420. In some instances, operation 422 may additionally or alternatively comprise determining one or more predicted positions of at least the closest object based at least in part on a velocity associated with the object. Operation 422 may additionally or alternatively include determining the closest object based at least in part on current and/or predicted positions of one or more objects and determining which object is or is predicted to be closest to the position 404 of the autonomous vehicle.

At operation 424, example process 400 may comprise determining whether a closest object is at a position or is predicted to be at a position that meets or exceeds a threshold distance, according to any of the techniques discussed herein. Operation 424 may comprise the threshold distance based at least in part on the trajectory. For example, the threshold distance may correspond with a maximum stopping distance of the vehicle and may include an additional safety margin in addition to the maximum stopping distance in some instances. In some examples, the threshold distance may be a distance along a line or curve associated with the trajectory. Operation 424 may comprise determining whether an object is or will be within less than the threshold distance of the autonomous vehicle (or a predicted position of the autonomous vehicle).

If an object is and/or is predicted to be at a position that is less than the threshold distance of the autonomous vehicle, example process 400 may continue to operation 426. If no object is and/or is predicted to be within the threshold distance of the autonomous vehicle, example process 400 may continue to operation 428.

At operation 428, example process 400 may comprise causing the autonomous vehicle to execute a contingent trajectory and/or re-determine a trajectory, according to any of the techniques discussed herein. For example, causing the vehicle to execute a contingent trajectory may comprise transmitting instructions to a system controller to cause the vehicle to slow down, execute a safe-stop maneuver, hard-brake, and/or the like. In some examples, the planner may determine the contingent trajectory and transmit the contingent trajectory to the collision avoidance component with the trajectory and/or upon request by the collision avoidance component. In an additional or alternate example, operation 428 may comprise transmitting a request to the planner to determine a new trajectory.

At operation 428, example process 400 may comprise determining whether a furthest ground data point is at a distance that meets or exceeds the threshold distance, according to any of the techniques discussed herein. The furthest ground data point may be a sensor data point classified as being ground that is at a furthest, or one of the furthest, ground data points from the position (or predicted position) of the autonomous vehicle. Operation 428 may functionally be a check to ensure that there is sensor data far enough from the autonomous vehicle to ensure that the autonomous vehicle could stop before hitting any objects and has detected any objects within the autonomous vehicle's stopping distance, plus some margin in some instances.

If the furthest ground data point is at a distance from a current and/or predicted position of the autonomous vehicle that is less than the threshold distance, example process 400 may continue to operation 426; whereas if the furthest ground data point is at a distance from the autonomous vehicle that meets or exceeds the threshold distance, example process 400 may continue to operation 430.

In some examples, the techniques may comprise determining a first threshold distance associated with a closest object (at operation 424) and a second threshold distance associated with the furthest ground data point (at operation 428). In some examples, the second threshold distance may be greater than the first threshold distance, although they may be equal in some instances.

At operation 430, example process 400 may comprise validating and/or transmitting the trajectory, according to any of the techniques discussed herein. For example, validating and/or transmitting the trajectory may comprise causing the autonomous vehicle to execute the trajectory (e.g., by transmitting the trajectory to system controller(s)).

Example Difficult Ground-Classifying Scenario

Figure 6A:
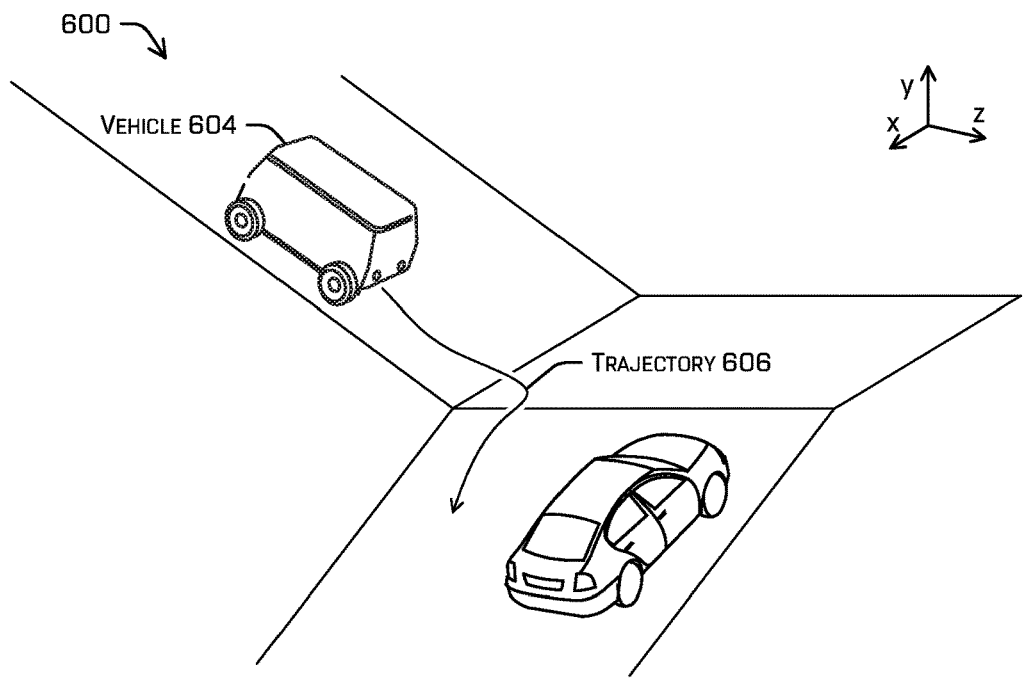
FIG. 6A illustrates an example scenario in which it may be difficult to classify sensor data as ground or as an object and FIG. 6B illustrates example sensor data associated with the example scenario of FIG. 6A, along with a corridor and classification of sensor data as a ground classification or an object classification.
Figure 6B:
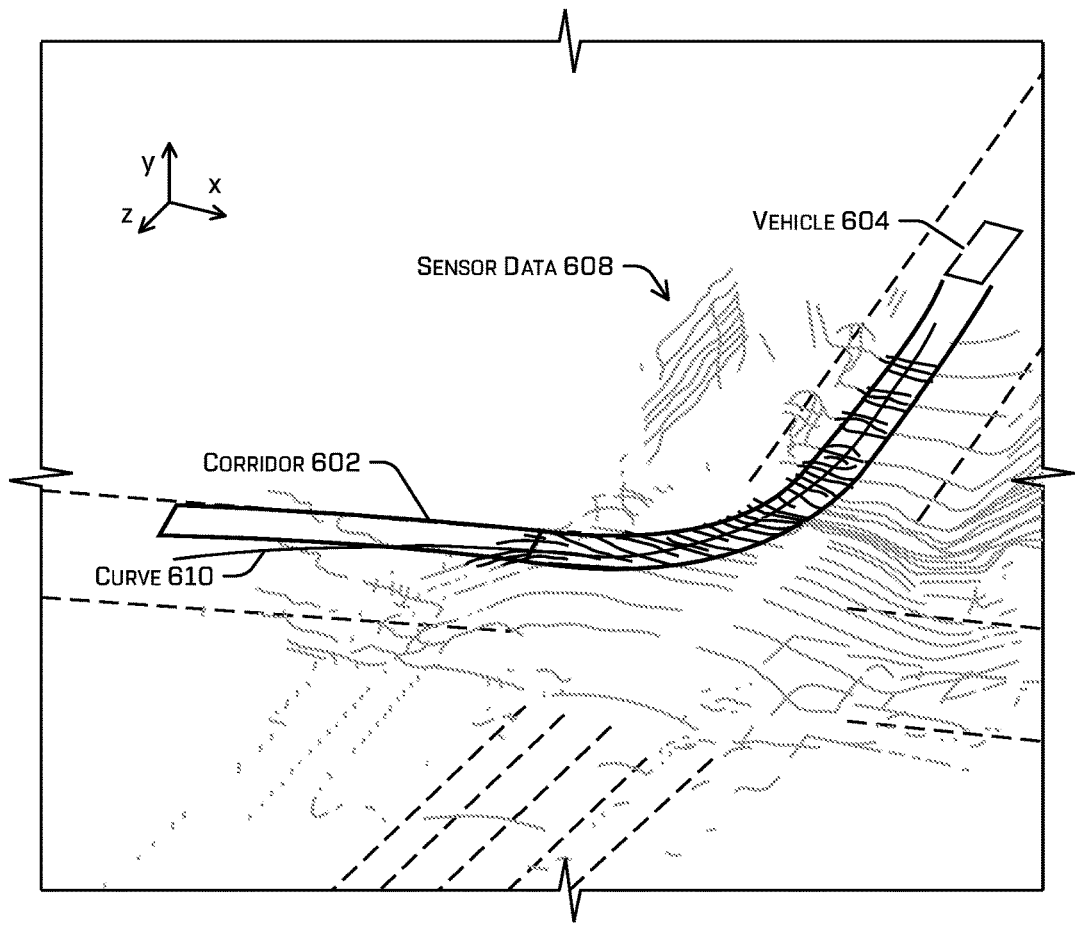

FIG. 6A illustrates an example scenario 600 in which it may be difficult to classify sensor data as ground or as an object and FIG. 6B illustrates example sensor data associated with the example scenario of FIG. 6A, along with a corridor 602 and classification of sensor data as a ground classification or an object classification.

FIG. 6A depicts an example scenario 600 in which a vehicle 604 navigates an environment that includes two changes of grade. In the depicted scenario, the roadway includes a negative grade, which flattens out for a time (zero grade), and resumes a negative grade thereafter, at least for the portion of the environment associated with trajectory 606. The vehicle 604 may have generated a trajectory 606 to cause the vehicle 604 to traverse the environment down the first negative grade, over a portion of the flat grade, and down the second negative grade. Environments that comprise a single grade (e.g., a flat roadway or a roadway that continuously slopes upwards or downwards without variation) present a simpler ground classification problem since the ground may be modeled using a plane or single degree line. Changes in grade present a more difficult problem since modeling the roadway as a plane may cause multiple false positive object and/or ground classifications and modeling the roadway using a simple polynomial may similarly lead to false positive object and/or ground classifications.

FIG. 6B depicts a corridor 602 associated with the trajectory 606 and sensor data 608, where the gray sensor data is sensor data that lies outside the corridor 602 and black sensor data lies within the corridor 602. The techniques discussed herein may comprise fitting a multi-degree line and/or plane to the sensor data 608. In some examples, the techniques may comprise determining a line and/or plane that fits sensor data within the corridor 602. For example, the line fitting may comprise fitting a curve 610 to the sensor data, where the curve may be a second (or more) order polynomial, a spline, a Bezier curve, a basis spline (B-spline) such as a non-uniform rational basis spline (NURBS), and/or the like. In some examples, determining the line may comprise outlier elimination and/or may be based at least in part on a bias determined based at least in part on one or more sensor data points associated with a lowest and/or highest elevation (and/or other local or global extrema). Because of the difficulty of comprehending the three-dimensional depiction in FIG. 6B, FIG. 8 includes a two-dimensional representation of sensor data projected into a two dimensional coordinate frame corresponding to an elevation profile along the trajectory 606 (e.g., ordinate values are associated with elevation and abscissa values are associated with a longitudinal position along the trajectory).

Example Process for Classifying Sensor Data as Ground

Figure 8:
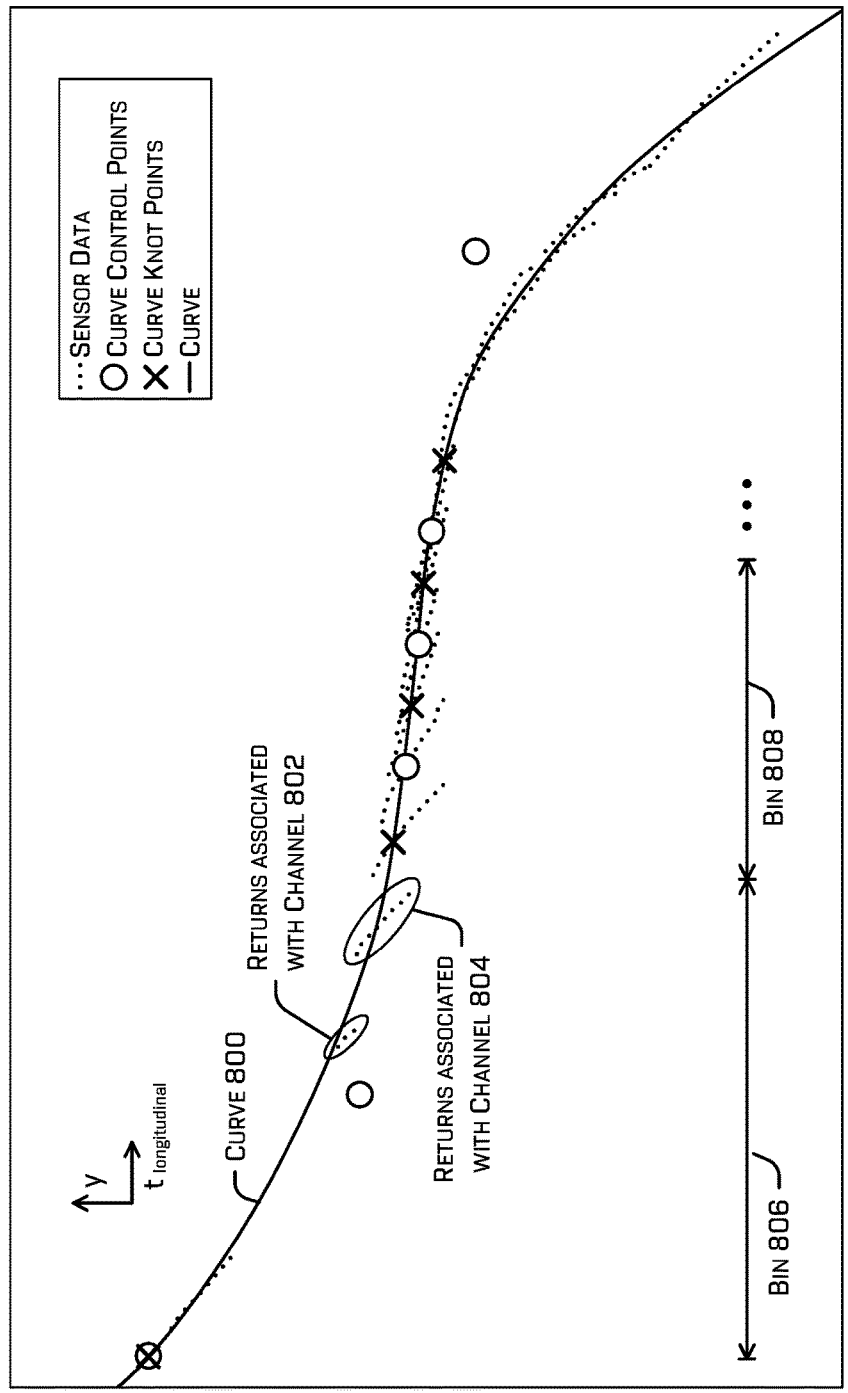
FIG. 8 illustrates an example curve fit to the sensor data according to the example process of FIG. 7.

FIG. 7 illustrates a pictorial flow diagram of an example process 700 for classifying sensor data as ground based at least in part on determining a curve to fit the sensor data. In some examples, the curve may be used to classify a sensor data point as an object. For example, classifying a sensor data point as an object may comprise determining that the sensor data point is located above the line. In some examples, example process 700 may be at least part of operation 412 and/or operation 420. Example process 700 may be preceded by projecting three-dimensional sensor data, such as lidar data, radar data, and/or the like, into a two-dimensional coordinate frame, such as depicted in FIG. 8 where the ordinate values are associated with an elevation and the abscissa values are associated with a longitudinal position along the trajectory generated by the autonomous vehicle. In some examples, example process 700 may be analogously applied to fitting a plane to the three-dimensional sensor data or fitting a line to a portion of the three-dimensional sensor data (e.g., three-dimensional sensor data having a same coordinate value, i.e., three-dimensional sensor data in a same plane or near (within a threshold distance of) a same plane). In some instances, example process 700 may comprise determining a subset of sensor data associated with a ground classification based at least in part on fitting a curve to sensor data and identifying sensor data points that are below or meet the curve, in elevation, as ground.

At operation 702, example process 700 may comprise mapping at least a portion of the sensor data to a lower-dimensional space, according to any of the techniques discussed herein. For example, operation 702 may comprise projecting three-dimensional sensor data points into a two-dimensional space. In some examples, the two-dimensional space may be associated with an elevation profile of the environment and/or a trajectory. The two-dimensional space may be referenced based at least in part on a trajectory and/or pose of an autonomous vehicle in some examples. In additional or alternate examples, the sensor data may originally comprise one or more dimensions, such as four or more dimensions. The mapping may comprise reducing a number of the dimensions to one or more dimensions associated with elevation/altitude and a longitudinal component of the trajectory of the autonomous vehicle. For example, FIG. 6B illustrates an image of three-dimensional sensor data and FIG. 8 illustrates a representative depicts of sensor data mapped to a lower-dimensional space (i.e., two dimensions in the depicted example).

At operation 704, example process 700 may comprise determining a first number of channels of the sensor data that include one or more returns within a corridor, according to any of the techniques discussed herein. A channel may comprise at least a detection portion associated with a sensor. For example, a lidar device may comprise a detector configured to receive a beam of light, a camera may include an image sensor comprising discrete detection portions (e.g., pixels), and/or the like.

In some examples, a sensor may output a "return" when a detector detects a return signal, such as reflected light (e.g., in the case of lidar, radar, and/or depth cameras), reflected sound waves (e.g., in the case of sonar), emitted heat (e.g., in the case of infrared or other thermal imaging cameras) and/or the like. In some examples, a channel may not generate a return when a return signal is diffracted or there are no surfaces within a maximum operating distance of the sensor to cause return a signal.

It is contemplated that, in some instances, a channel of a sensor device may comprise a detector that receives a signal from an environmental signal emitter. For example, a thermal imaging camera may comprise a detection component that receives heat from objects in the environment that create heat themselves. Regardless, a channel may be associated with a pixel, detector, and/or any other discrete portion of a sensor detection system.

For example, FIG. 7 depicts lidar data, which may comprise returns associated with a channel 706, returns associated with a channel 708, and returns associated with a channel 710, among many other channels. For example, each contour of the depicted sensor data may correspond with a different channel of a lidar sensor.

Operation 704 may comprise determining a first number of channels that comprise returns and/or that comprise more than a threshold number (e.g., a percentage) of returns within the corridor 712. For example, operation 704 may comprise determining a subset of sensor data associated with the corridor 712 and determining a number of channels associated with returns of the subset. In some examples, determining the number of channels may comprise determining the number of channels that include more than 90% or more than 50% (or any other number) of returns in the channel, as opposed to non-returns. In some examples, the first number may be a positive integer.

At operation 714, example process 700 may comprise determining a second number of control points and/or a third number of knots of a curve (e.g., Bezier) based at least in part on the first number, according to any of the techniques discussed herein. Operation 714 may comprise determining a dimension of a knot vector and/or a control point vector associated with the curve, which may include a polynomial and/or spline, such as a Bezier curve, B-spline, NURBS, and/or the like. In some examples, the second number of control points may be equal to or less than the first number. Selecting the second number (of control points) to be less than the first number (of channels that have returns) may reduce overfitting, which may, in turn, reduce falsely classifying an object as ground. In some examples, a minimum second number may be two, although other numbers are contemplated, such as one or three or more. The third number (of knots) may be related to the second number of control points and a curve degree (e.g., which may be set to equal two or, in additional or alternate examples, three or more). For example, the third number of knots may equal the second number of control points plus the curve degree plus one. In some examples, the second number and/or the third number may be a positive integer.

A knot may define a terminus of a span of the curve. The span of the curve may be defined by a polynomial (or other curve function), the parameters of which may be defined by one or more control points.

At operation 716, example process 700 may comprise determining, based at least in part on a portion of the sensor data within the corridor, a curve having the second number of control points and/or the third number of knots, according to any of the techniques discussed herein. Operation 716 may additionally or alternatively comprise one or more pre-fitting operation such as, for example, removing potentially erroneous sensor data points (e.g., such as by clustering returns in a channel and removing outliers, robust estimation techniques (e.g., RANSAC)) and/or weighting the sensor data.

For example, weighting the sensor data may comprise determining a fourth number of bins based at least in part on the first number of channels that have returns—the more channels that include returns, the more bins that may be generated. For example, FIG. 7 depicts example sensor data 718, bin 720, and bin 722. In some examples, the bins may be evenly spaced or may be spaced to include a same number of sensor data points. In some examples, sensor data associated with bin 720 may be weighted separately from sensor data associated with bin 722. Weighting the sensor data may comprise determining a range of the sensor data associated with the bin. For example, FIG. 7 depicts range 724, which may additionally or alternatively represented as a difference between highest and lowest sensor data points, in elevation. In some examples, if the range/difference is less than a minimum object height (e.g., 1 meter, 0.5 meters, 20 centimeters, any other value), the sensor data associated with the bin may be assign a same weight (e.g., 1). The sensor data associated with bin 720 may be weighted with a same weight, for example, since the sensor data associated therewith demonstrates low variation in elevation.

However, if the range/difference meets or exceeds the minimum object height, determining the weights for the sensor data associated with the bin may comprise weighting sensor data towards the bottom of the sensor data (in elevation) more heavily. For example, sensor data points associated with a bottom quartile or other percentile (e.g., $30^{th}$ percentile and below, $20^{th}$ percentile and below, $10^{th}$ percentile and below) may be more heavily weighted than sensor data points associated with elevations above the elevation defined by the quartile or other percentile. Regardless, sensor data points identifying lower elevations may be weighed more heavily, based on the presumption that such data points are more likely to be associated with ground than with an object.

Operation 716 may comprise a fitting algorithm that minimizes a total residual associated with differences (errors) between individual sensor data points and the curve 726. The fitting algorithm may determine values of the control point vector and/or knot vector, which may define locations of control point(s) and/or knot(s). The control points and knots may define a spline or other curve. In some examples, the fitting algorithm may comprise a least squares regression to fit an estimated curve, defined by the control points and knots, to the sensor data. In some examples, the fitting algorithm may be a weighted algorithm, such as weighted least squares (e.g., using the weights determined in association with the sensor data based at least in part on the elevations defined by the sensor data), although any other suitable fitting algorithm may be used, such as any of a variety of nonlinear least squares algorithms, such as the Gauss-Newton algorithm, and/or the like.

In some examples, a loss function may determine a loss based at least in part on determining residuals (errors) between the sensor data and the estimated curve. In some examples, the loss function may determine a weight associated with a residual 728 between the curve 726 and a sensor data point 730. In some examples, the loss function may be a skewed loss function that weights negative residuals more heavily than positive residuals. For example, residual 728 is a positive residual since the sensor data point 730 is above the curve 726, whereas a residual 732 associated with sensor data point 734 is a negative residual. The loss function may determine a first weight associated with residual 732 that is greater than a second weight associated with residual 728. In other words, the loss function may determine a loss that is greater for a first residual associated with a first sensor data point that is below the estimated curve than for a second residual associated with a second sensor data point above the estimated curve. Functionally, this means that the fitting algorithm will modify the estimated curve based more heavily on residual 732 than residual 728, which will effectively cause an updated estimated curve determined by the fitting algorithm based at least in part on the weighted residuals to move towards sensor data point 734, considering just the influence from the illustrated residuals and no others.

At operation 736, example process 700 may comprise altering the curve, control points, and/or knots based at least in part on the portion of sensor data and/or a ruleset, according to any of the techniques discussed herein. The ruleset may be generated based at least in part on the portion of the sensor data and may specify maximum elevation values of the control points based at least in part on elevation values of the sensor data (e.g., a control point may not have an elevation that exceeds a maximum elevation value of the sensor data) and/or a knot spacing technique. For example, the knot spacing technique may comprise determining a spacing (e.g., a distance) between knots, indicated with an "x" in FIG. 7, and altering the spacing therebetween so that the knots are evenly spaced over distance. Some fitting algorithms may space the knots based at least in part on an index numbers of the sensor data (e.g., such that the knots are evenly distributed across the index numbers), but this may cause some knots to be overly distant or close to each other spatially.

For example, FIG. 7 depicts spacing 738 between a first knot and second knot and spacing 740 between the second knot and a third knot. The spacing 738 is smaller than spacing 740 because more sensor data lies between the first knot and the second knot and the fitting technique determine the knot locations based at least in part on sensor data index. Altering the knot spacing may comprise altering locations of the knots based at least in part on a length of the curve (e.g., a length of the curve, a longitudinal distance spanned by the curve) and a number of knots. In some examples, altering the knot locations may comprise altering the knot locations such that the knots are evenly spaced along the curve or along a longitudinal distance spanned by the curve or, in an additional or alternate example, altering the knot locations may comprise a "rough" alteration that moves the knots towards an even spacing, but doesn't rigidly move the knots to a perfectly even spacing. For example, the latter technique may comprise defining a range associated with an location associated with an even knot placement and moving a knot location until it is within the range. The range may be based at least in part on a sensor data density, an overall length of the curve, a roadway grade, a number of grade inflection points (changes from positive to negative or vice versa), and/or the like.

FIG. 8 illustrates an example curve 800, which may represent curve 726, fit to the sensor data according to the example process of FIG. 7. Note that sensor data is represented as dots, control points are represented with a circle, knots are represented with an "x", and the curve 800 is represented as a solid line. Note that FIG. 8 also depicts an example of returns associated with a channel 802, returns associated with a channel 804, a bin 806, and a bin 808. Also, note that, at least for the depicted example, the curve 800 was be generated for three-dimensional sensor data projected into a two-dimensional coordinate frame, representing elevation on a vertical axis and points along a longitudinal component of the trajectory along the horizontal axis. The curve may be determined in the two-dimensional space and projected back into the three-dimensional space associated with the original sensor data in order to determine whether sensor data is associated with a ground classification (e.g., sensor data that has an elevation less than or equal to the curve) or an object classification (e.g., sensor data that has an elevation above the curve). Such a determination may comprise translating the curve across the corridor to iteratively determine whether sensor data associated with a portion of the corridor is ground or an object.

Example Clauses

A. A method comprising: receiving a trajectory for controlling operation of an autonomous vehicle; receiving sensor data from a sensor associated with the autonomous vehicle; at least one of determining or receiving a corridor indicative of a bounded region in front of the autonomous vehicle in which the autonomous vehicle is constrained to travel; determining a first subset of the sensor data associated with the corridor and a ground classification; determining a second subset the sensor data associated with the corridor and an object classification; determining, based at least in part on the second subset, a position and a velocity associated with at least a portion of an object; and determining, based at least in part on at least one of the position or the velocity, to: control the autonomous vehicle to perform the trajectory, or control the autonomous vehicle to perform a contingent trajectory.

B. The method of paragraph A, wherein: the velocity is a first velocity; and the method further comprises: determining a threshold distance associated with a second velocity associated with the autonomous vehicle, and at least one of determining a first distance from the autonomous vehicle to the position of the object or a second distance from the autonomous vehicle to a point of the first subset that is furthest from the autonomous vehicle.

C. The method of paragraph B, wherein controlling the autonomous vehicle to perform the trajectory is based at least in part on: determining that the first distance meets or exceeds the threshold distance, and determining that the second distance meets or exceeds the threshold distance.

D. The method of either paragraph B or C, wherein controlling the autonomous vehicle to perform the contingent trajectory is based at least in part on: determining that the first distance is less than the threshold distance, or determining that the second distance is less than the threshold distance.

E. The method of any one of paragraphs A-D, wherein classifying the first subset of the sensor data as the ground classification comprises at least one of: fitting a line to at least part of the sensor data; determining, as the first subset, first points of the sensor data that are within a threshold distance of the line; or determining, as the first subset, first points have a variance in spacing less than or equal to a variance threshold.

F. The method of any one of paragraphs A-E, wherein classifying the second subset of the sensor data as the object classification comprises at least one of: fitting a line to at least part of the sensor data; determining, as the second subset, second points of the sensor data that are above the line; or determining that an angle between two points of the second subset is outside a range of angles or a spacing between the two points is outside a range of distances.

G. A system comprising: one or more sensors; one or more processors; and a memory storing processor-executable instructions that, when executed by the one or more processors, cause the system to perform operations comprising: receiving sensor data from a sensor associated with a vehicle; at least one of receiving or determining a corridor associated with operation of the vehicle; determining a first subset of the sensor data associated with the corridor and a ground classification; determining a second subset the sensor data associated with the corridor and an object classification; determining, based at least in part on a first velocity of the vehicle, a threshold distance; and controlling the vehicle based at least in part on the threshold distance and at least one of the first subset or the second subset.

H. The system of paragraph G, wherein controlling the vehicle is further based at least in part on determining, based at least in part on the second subset, a position and a second velocity associated with at least a portion of an object.

I. The system of paragraph H, wherein controlling the vehicle further comprises: determining at least one of a first distance from the vehicle to the position or, based at least in part on at least one of the first velocity or the second velocity, a second distance from the vehicle to a predicted position of the object; and causing the vehicle to execute a contingent trajectory based at least in part on determining that at least one of the first distance or the second distance is less than the threshold distance.

J. The system of any one of paragraphs G-I, wherein controlling the vehicle further comprises: determining a distance from the vehicle to a furthest point of the first subset; and causing the vehicle to follow a contingent trajectory based at least in part on determining that the distance is less than the threshold distance.

K. The system of any one of paragraphs G-J, wherein controlling the vehicle further comprises: determining a first distance from the vehicle to a furthest point of the first subset or a second distance from the vehicle to a nearest point of the second subset; and causing the vehicle to follow a trajectory based at least in part on determining that the first distance and the second distance meet or exceed the threshold distance.

L. The system of any one of paragraphs G-K, wherein classifying the first subset of the sensor data as the ground classification comprises at least one of: fitting a line to at least part of the sensor data; determining, as the first subset, first points of the sensor data that are within a second threshold distance of the line; or determining, as the first subset, first points that have a variance in spacing or variance in angular displacement less than or equal to a variance threshold.

M. The system of any one of paragraphs G-L, wherein classifying the second subset of the sensor data as the object classification comprises at least one of: fitting a line to at least part of the sensor data; determining, as the second subset, second points of the sensor data that are above the line; or determining that an angle between two points of the second subset is outside a range of angles or a spacing between the two points is outside a range of distances.

N. A non-transitory computer-readable medium storing processor-executable instructions that, when executed by one or more processors, cause the one or more processors to perform operations comprising: receiving sensor data from a sensor associated with a vehicle; at least one of determining or receiving a corridor associated with operation of the vehicle; determining a first subset of the sensor data associated with the corridor and a ground classification; determining a second subset the sensor data associated with the corridor and an object classification; determining, based at least in part on a first velocity of the vehicle, a threshold distance; and controlling the vehicle based at least in part on the threshold distance and at least one of the first subset or the second subset.

O. The non-transitory computer-readable medium of paragraph N, wherein controlling the vehicle is further based at least in part on determining, based at least in part on the second subset, a position and a second velocity associated with at least a portion of an object.

P. The non-transitory computer-readable medium of paragraph O, wherein controlling the vehicle further comprises: determining at least one of a first distance from the vehicle to the position or, based at least in part on at least one of the first velocity or the second velocity, a second distance from the vehicle to a predicted position of the object; and causing the vehicle to execute a contingent trajectory based at least in part on determining that at least one of the first distance or the second distance is less than or equal to the threshold distance.

Q. The non-transitory computer-readable medium of any one of paragraphs N-P, wherein controlling the vehicle further comprises: determining a distance from the vehicle to a furthest point of the first subset; and causing the vehicle to follow a contingent trajectory based at least in part on determining that the distance is less than the threshold distance.

R. The non-transitory computer-readable medium of any one of paragraphs N-Q, wherein controlling the vehicle further comprises: determining a first distance from the vehicle to a furthest point of the first subset or a second distance from the vehicle to a nearest point of the second subset; and causing the vehicle to follow a trajectory based at least in part on determining that the first distance and the second distance meet or exceed the threshold distance.

S. The non-transitory computer-readable medium of any one of paragraphs N-R, wherein classifying the first subset of the sensor data as the ground classification comprises at least one of: fitting a line to at least part of the sensor data; determining, as the first subset, first points of the sensor data that are within a second threshold distance of the line; or determining, as the first subset, first points have a variance in spacing or variance in angular displacement less than or equal to a variance threshold.

T. The non-transitory computer-readable medium of any one of paragraphs N-S, wherein classifying the second subset of the sensor data as the object classification comprises at least one of: fitting a line to at least part of the sensor data; determining, as the second subset, second points of the sensor data that are above the line; or determining that an angle between two points of the second subset is outside a range of angles or a spacing between the two points is outside a range of distances.

U. A method comprising: receiving lidar data from a lidar sensor associated with an autonomous vehicle; receiving a corridor associated with a trajectory of the autonomous vehicle; determining a first subset of the lidar data associated with a ground classification based at least in part on: mapping a portion of the lidar data associated with the corridor and the first number of channels to a two-dimensional representation; determining a number of channels of the lidar sensor that include one or more returns associated with the corridor; determining, based at least in part on the number of channels, a number of control points and a number of knots; determining, based at least in part on a portion of the lidar data within the corridor, a curve having the number of control points and the number of knots; and determining the first subset based at least in part on the curve; and controlling the autonomous vehicle based at least in part on the first subset.

V. The method of paragraph U, wherein determining the curve further comprises limiting an elevation value associated with a control point to an average elevation of the lidar data plus a buffer distance.

W. The method of either paragraph U or V, wherein determining the curve further comprises: determining, based at least in part on the portion of lidar data, an estimated curve having the number of control points and the number of knots; determining a threshold distance based at least in part on the number of knots and a length of the estimated curve; determining a distance between a first knot and a second knot associated with the estimated curve is less than the threshold distance; and altering a position of at least one of the first knot or the second knot such that the distance therebetween along the estimated curve meets or exceeds the threshold distance.

X. The method of any one of paragraphs U-W, wherein determining the curve further comprises: determining a residual between a lidar point and an estimated curve; determining, based at least in part on the residual, a loss, the loss being greater for a first residual associated with a first lidar point below the estimated curve than for a second residual associated with a second lidar point above the estimated curve; and altering the estimated curve based at least in part on the loss.

Y. The method of any one of paragraphs U-X, wherein determining the curve further comprises: determining a number of bins based at least in part on the number of channels; dividing the portion of lidar data across the bins, a bin being associated with a second subset of the portion of lidar data, wherein the second subset comprises a lidar data point; and determining weights associated with the second subset, wherein determining the weights comprises determining a weight associated with the lidar data point based at least in part on an elevation associated with the lidar data point.

Z. The method of any one of paragraphs U-Y, further comprising determining, based at least in part on the first subset, a second subset of the lidar data associated with an object classification; and determining, based at least in part on the second subset, a position and a velocity associated with at least a portion of an object, wherein controlling the autonomous vehicle comprises determining, based at least in part on at least one of the position or the velocity, to: control the autonomous vehicle to perform the trajectory, or control the autonomous vehicle to perform a contingent trajectory.

AA. A system comprising: one or more sensors; one or more processors; and a memory storing processor-executable instructions that, when executed by the one or more processors, cause the system to perform operations comprising: receiving sensor data from a sensor associated with an autonomous vehicle; receiving a corridor associated with a trajectory of the autonomous vehicle; determining a first subset of the sensor data associated with a ground classification based at least in part on: mapping a portion of the sensor data associated with the corridor and the first number of channels to a lower-dimensional representation; determining a number of channels of the sensor that include one or more returns associated with the corridor; determining, based at least in part on the number of channels, a number of control points and a number of knots; determining, based at least in part on a portion of the sensor data within the corridor, a curve having the number of control points and the number of knots; and determining the first subset based at least in part on the curve; and controlling the autonomous vehicle based at least in part on the first subset.

AB. The system of paragraph AA, wherein determining the curve further comprises limiting an elevation value associated with a control point to an average elevation of the sensor data plus a buffer distance.

AC. The system of either paragraph AA or AB, wherein determining the curve further comprises: determining, based at least in part on the portion of sensor data, an estimated curve having the number of control points and the number of knots; determining a threshold distance based at least in part on the number of knots and a length of the estimated curve; determining a distance between a first knot and a second knot associated with the estimated curve is less than the threshold distance; and altering a position of at least one of the first knot or the second knot such that the distance therebetween meets or exceeds the threshold distance.

AD. The system of any one of paragraphs AA-AC, wherein determining the curve further comprises: determining a residual between a sensor data point and an estimated curve; determining, based at least in part on the residual, a loss, the loss being greater for a first residual associated with a first sensor data point below the estimated curve than for a second residual associated with a second sensor data point above the estimated curve; and altering the estimated curve based at least in part on the loss.

AE. The system of any one of paragraphs AA-AD, wherein determining the curve further comprises: determining a number of bins based at least in part on the number of channels; dividing the portion of sensor data across the bins, a bin being associated with a second subset of the portion of sensor data, wherein the second subset comprises a sensor data point; and determining weights associated with the second subset, wherein determining the weights comprises determining a weight associated with the sensor data point based at least in part on an elevation associated with the sensor data point.

AF. The system of any one of paragraphs AA-AE, wherein determining the curve is based at least in part on: determining a residual between the sensor data point and an estimated curve; determining a loss based at least in part on one or more residuals and the weight; and determining the curve based at least in part on locating the control points and knots to reduce the loss.

AG. The system of any one of paragraph AA-AF, wherein determining the weight further comprises: determining a maximum elevation and a minimum elevation associated with the second subset; and either: determining the weights to be a same weight based at least in part on determining that a difference between the maximum elevation and the minimum elevation is less than a threshold obstacle height; or determining the weights to be larger for sensor data points of the second subset that have an elevation below a threshold elevation, based at least in part on determining that the difference meets or exceeds the threshold obstacle height.

AH. A non-transitory computer-readable medium storing processor-executable instructions that, when executed by one or more processors, cause the one or more processors to perform operations comprising: receiving sensor data from a sensor associated with an autonomous vehicle; receiving a corridor associated with a trajectory of the autonomous vehicle; determining a first subset of the sensor data associated with a ground classification based at least in part on: determining a number of channels of the sensor that include one or more returns associated with the corridor; determining, based at least in part on the number of channels, a number of control points and a number of knots; determining, based at least in part on a portion of the sensor data within the corridor, a curve having the number of control points and the number of knots; and determining the first subset based at least in part on the curve; and controlling the autonomous vehicle based at least in part on the first subset.

AI. The non-transitory computer-readable medium of paragraph AH, wherein determining the curve further comprises limiting an elevation value associated with a control point to an average elevation of the sensor data plus a buffer distance.

AJ. The non-transitory computer-readable medium of either paragraph AH or AI, wherein determining the curve further comprises: determining, based at least in part on the portion of sensor data, an estimated curve having the number of control points and the number of knots; determining a threshold distance based at least in part on the number of knots and a length of the estimated curve; determining a distance between a first knot and a second knot associated with the estimated curve is less than the threshold distance; and altering a position of at least one of the first knot or the second knot such that the distance therebetween meets or exceeds the threshold distance.

AK. The non-transitory computer-readable medium of any one of paragraphs AH-AJ, wherein determining the curve further comprises: determining a residual between a sensor data point and an estimated curve; determining, based at least in part on the residual, a loss, the loss being greater for a first residual associated with a first sensor data point below the estimated curve than for a second residual associated with a second sensor data point above the estimated curve; and altering the estimated curve based at least in part on the loss.

AL. The non-transitory computer-readable medium of any one of paragraphs AH-AK, wherein determining the curve further comprises: determining a number of bins based at least in part on the number; dividing the portion of sensor data across the bins, a bin being associated with a second subset of the portion of sensor data, wherein the second subset comprises a sensor data point; and determining weights associated with the second subset, wherein determining the weights comprises determining a weight associated with the sensor data point based at least in part on an elevation associated with the sensor data point.

AM. The non-transitory computer-readable medium of paragraph AL, wherein determining the curve is based at least in part on: determining a residual between the sensor data point and an estimated curve; determining a loss based at least in part on one or more residuals and the weight; and determining the curve based at least in part on locating the control points and knots to reduce the loss.

AN. The non-transitory computer-readable medium of paragraph AM, wherein determining the weight further comprises: determining a maximum elevation and a minimum elevation associated with the second subset; and either: determining the weights to be a same weight based at least in part on determining that a difference between the maximum elevation and the minimum elevation is less than a threshold obstacle height; or determining the weights to be larger for sensor data points of the second subset that have an elevation below a threshold elevation, based at least in part on determining that the difference meets or exceeds the threshold obstacle height.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
    receiving lidar data from a lidar sensor associated with an autonomous vehicle;
    receiving a corridor associated with a trajectory of the autonomous vehicle;
    determining a first subset of the lidar data associated with a ground classification based at least in part on:
        mapping, as reduced lidar data, a portion of the lidar data associated with the corridor and a first number of channels to a two-dimensional representation;
        determining a second number of channels of the lidar sensor that include one or more returns associated with the corridor;
        determining, based at least in part on the second number of channels, a number of control points and a number of knots;
        determining, based at least in part on a portion of the reduced lidar, data, a curve having the number of control points and the number of knots in the two-dimensional representation; and
        determining the first subset based at least in part on the curve; and
    controlling the autonomous vehicle based at least in part on the first subset.

2. The method of claim 1, wherein determining the curve further comprises limiting an elevation value associated with a control point to an average elevation of the reduced lidar data plus a buffer distance.

3. The method of claim 1, wherein determining the curve further comprises:
    determining, based at least in part on the portion of the reduced lidar data, an estimated curve having the number of control points and the number of knots;
    determining a threshold distance based at least in part on the number of knots and a length of the estimated curve;
    determining a distance between a first knot and a second knot associated with the estimated curve is less than the threshold distance; and
    altering a position of at least one of the first knot or the second knot such that the distance between the first knot and the second knot along the estimated curve meets or exceeds the threshold distance.

4. The method of claim 1, wherein determining the curve further comprises:
    determining a residual between a lidar point and an estimated curve;
    determining, based at least in part on the residual, a loss, the loss being greater for a first residual associated with a first lidar point below the estimated curve than for a second residual associated with a second lidar point above the estimated curve; and
    altering the estimated curve based at least in part on the loss.

5. The method of claim 1, wherein determining the curve further comprises:
    determining a number of bins based at least in part on the second number of channels;
    dividing the portion of the reduced lidar data across the bins, a bin being associated with a second subset of the portion of the reduced lidar data, wherein the second subset comprises a lidar data point; and
    determining weights associated with the second subset, wherein determining the weights comprises determining a weight associated with the lidar data point based at least in part on an elevation associated with the lidar data point.

6. The method of claim 1, further comprising
    determining, based at least in part on the first subset, a second subset of the reduced lidar data associated with an object classification; and
    determining, based at least in part on the second subset, a position and a velocity associated with at least a portion of an object,
    wherein controlling the autonomous vehicle comprises determining, based at least in part on at least one of the position or the velocity, to:
        control the autonomous vehicle to perform the trajectory, or
        control the autonomous vehicle to perform a contingent trajectory.

7. A system comprising:
    one or more sensors;
    one or more processors; and
    a memory storing processor-executable instructions that, when executed by the one or more processors, cause the system to perform operations comprising:
        receiving sensor data from a sensor associated with an autonomous vehicle;
        receiving a corridor associated with a trajectory of the autonomous vehicle;

determining a first subset of the sensor data associated with a ground classification based at least in part on:
  mapping, as reduced sensor data, a portion of the sensor data associated with the corridor and a first number of channels to a lower-dimensional representation;
  determining a second number of channels of the sensor that include one or more returns associated with the corridor;
  determining, based at least in part on the second number of channels, a number of control points and a number of knots;
  determining, based at least in part on a portion of the reduced sensor data, a curve having the number of control points and the number of knots in the lower-dimensional representation; and
  determining the first subset based at least in part on the curve; and
controlling the autonomous vehicle based at least in part on the first subset.

8. The system of claim 7, wherein determining the curve further comprises limiting an elevation value associated with a control point to an average elevation of the reduced sensor data plus a buffer distance.

9. The system of claim 7, wherein determining the curve further comprises:
determining, based at least in part on the portion of the reduced sensor data, an estimated curve having the number of control points and the number of knots;
determining a threshold distance based at least in part on the number of knots and a length of the estimated curve;
determining a distance between a first knot and a second knot associated with the estimated curve is less than the threshold distance; and
altering a position of at least one of the first knot or the second knot such that the distance between the first knot and the second knot meets or exceeds the threshold distance.

10. The system of claim 7, wherein determining the curve further comprises:
determining a residual between a sensor data point and an estimated curve;
determining, based at least in part on the residual, a loss, the loss being greater for a first residual associated with a first sensor data point below the estimated curve than for a second residual associated with a second sensor data point above the estimated curve; and
altering the estimated curve based at least in part on the loss.

11. The system of claim 7, wherein determining the curve further comprises:
determining a number of bins based at least in part on the second number of channels;
dividing the portion of the reduced sensor data across the bins, a bin being associated with a second subset of the portion of the reduced sensor data, wherein the second subset comprises a sensor data point; and
determining weights associated with the second subset, wherein determining the weights comprises determining a weight associated with the sensor data point based at least in part on an elevation associated with the sensor data point.

12. The system of claim 11, wherein determining the curve is based at least in part on:
determining a residual between the sensor data point and an estimated curve;
determining a loss based at least in part on one or more residuals and the weight; and
determining the curve based at least in part on locating the control points and the knots to reduce the loss.

13. The system of claim 11, wherein determining the weight further comprises:
determining a maximum elevation and a minimum elevation associated with the second subset; and either:
  determining the weights to be a same weight based at least in part on determining that a difference between the maximum elevation and the minimum elevation is less than a threshold obstacle height; or
  determining the weights to be larger for sensor data points of the second subset that have an elevation below a threshold elevation, based at least in part on determining that the difference meets or exceeds the threshold obstacle height.

14. A non-transitory computer-readable medium storing processor-executable instructions that, when executed by one or more processors, cause the one or more processors to perform operations comprising:
receiving sensor data from a sensor associated with an autonomous vehicle;
receiving a corridor associated with a trajectory of the autonomous vehicle;
determining a first subset of the sensor data associated with a ground classification based at least in part on:
  determining a number of channels of the sensor that include one or more returns associated with the corridor;
  determining, based at least in part on the number of channels, a number of control points and a number of knots;
  determining, based at least in part on a portion of the sensor data within the corridor, a curve having the number of control points and the number of knots; and
  determining the first subset based at least in part on the curve; and
controlling the autonomous vehicle based at least in part on the first subset.

15. The non-transitory computer-readable medium of claim 14, wherein determining the curve further comprises limiting an elevation value associated with a control point to an average elevation of the sensor data plus a buffer distance.

16. The non-transitory computer-readable medium of claim 14, wherein determining the curve further comprises:
determining, based at least in part on the portion of the sensor data, an estimated curve having the number of control points and the number of knots;
determining a threshold distance based at least in part on the number of knots and a length of the estimated curve;
determining a distance between a first knot and a second knot associated with the estimated curve is less than the threshold distance; and
altering a position of at least one of the first knot or the second knot such that the distance between the first knot and the second knot meets or exceeds the threshold distance.

17. The non-transitory computer-readable medium of claim 14, wherein determining the curve further comprises:
determining a residual between a sensor data point and an estimated curve;
determining, based at least in part on the residual, a loss, the loss being greater for a first residual associated with a first sensor data point below the estimated curve than for a second residual associated with a second sensor data point above the estimated curve; and altering the estimated curve based at least in part on the loss.

18. The non-transitory computer-readable medium of claim 14, wherein determining the curve further comprises:

determining a number of bins based at least in part on the number of channels;

dividing the portion of the sensor data across the bins, a bin being associated with a second subset of the portion of the sensor data, wherein the second subset comprises a sensor data point; and determining weights associated with the second subset, wherein determining the weights comprises determining a weight associated with the sensor data point based at least in part on an elevation associated with the sensor data point.

19. The non-transitory computer-readable medium of claim 18, wherein determining the curve is based at least in part on:

determining a residual between the sensor data point and an estimated curve;

determining a loss based at least in part on one or more residuals and the weight; and determining the curve based at least in part on locating the control points and the knots to reduce the loss.

20. The non-transitory computer-readable medium of claim 19, wherein determining the weight further comprises:

determining a maximum elevation and a minimum elevation associated with the second subset; and either:

determining the weights to be a same weight based at least in part on determining that a difference between the maximum elevation and the minimum elevation is less than a threshold obstacle height; or determining the weights to be larger for sensor data points of the second subset that have an elevation below a threshold elevation, based at least in part on determining that the difference meets or exceeds the threshold obstacle height.

* * * * *